United States Patent
Kirsch

[11] 3,788,505
[45] Jan. 29, 1974

[54] METHOD FOR VACUUM PICK-UP OF POROUS MATERIALS

[76] Inventor: Jerry Kirsch, 36 Beacon Hill, Grosse Pointe Farms, Mich. 48236

[22] Filed: Nov. 3, 1972

[21] Appl. No.: 303,605

Related U.S. Application Data

[62] Division of Ser. No. 181,074, Sept. 16, 1971, Pat. No. 3,710,953.

[52] U.S. Cl. .............................................. 214/152
[51] Int. Cl. .............................................. B66c 1/02
[58] Field of Search. 294/64 R, 65; 214/1 BS, 1 BT, 214/1 BH, 1 BV, 8.5 D, 15 Z

[56] References Cited
UNITED STATES PATENTS

| | | | |
|---|---|---|---|
| 3,140,890 | 7/1964 | Schwartz | 294/86 X |
| 3,448,510 | 6/1969 | Bippus | 214/1 R |

Primary Examiner—Gerald M. Forlenza
Assistant Examiner—George F. Abraham
Attorney, Agent, or Firm—Willis Bugbee

[57] ABSTRACT

Porous materials, such as cloth or unglazed ceramics or porous plastics which on account of their porosity defy ordinary vacuum pick-up, are made temporarily imperforate by applying to them a temporary coating of liquid, such as water, whereupon their porosity is momentarily sufficiently inhibited to permit their pick-up and transfer by suction, as by a suction cup device. The liquid coating is deposited either by rolling or spraying the liquid onto the porous material either from above it (FIG. 1) or from beneath it either for a single layer (FIG. 2) or for a plurality of layers thereof (FIG. 3).

4 Claims, 3 Drawing Figures

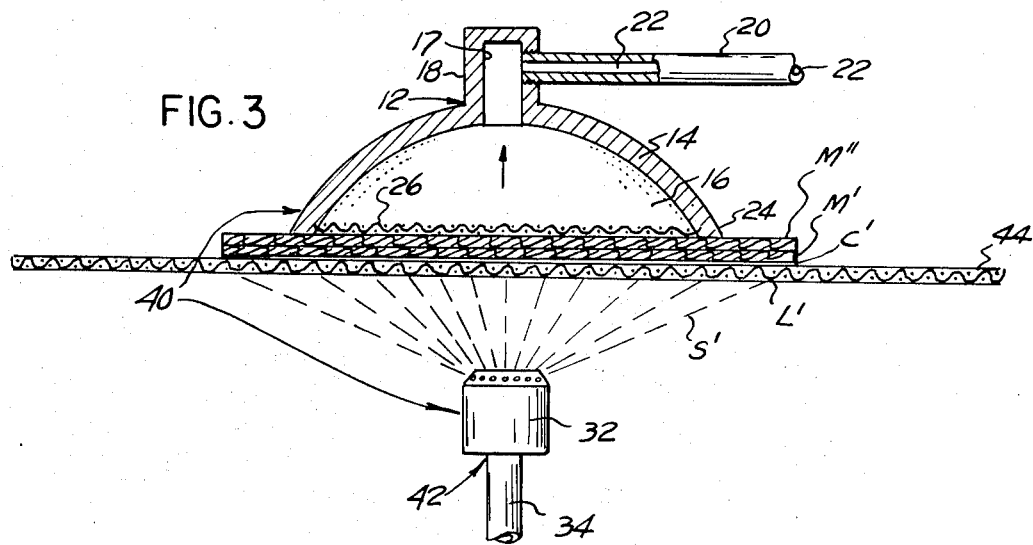
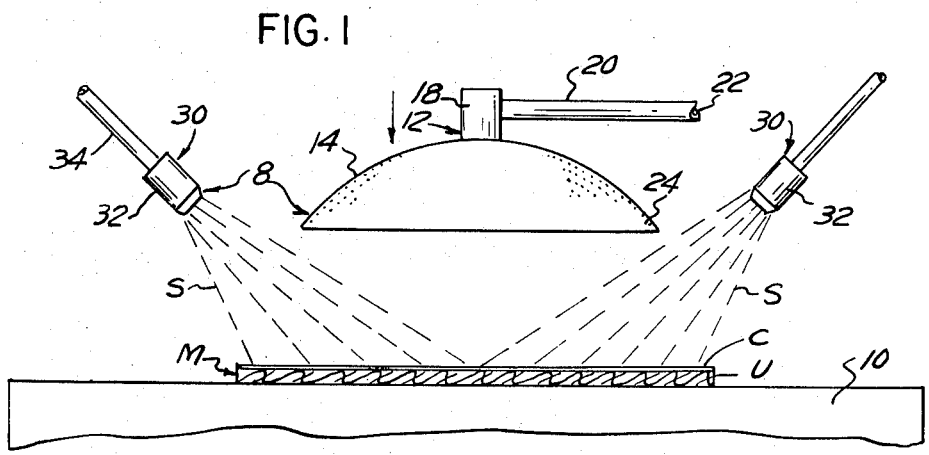
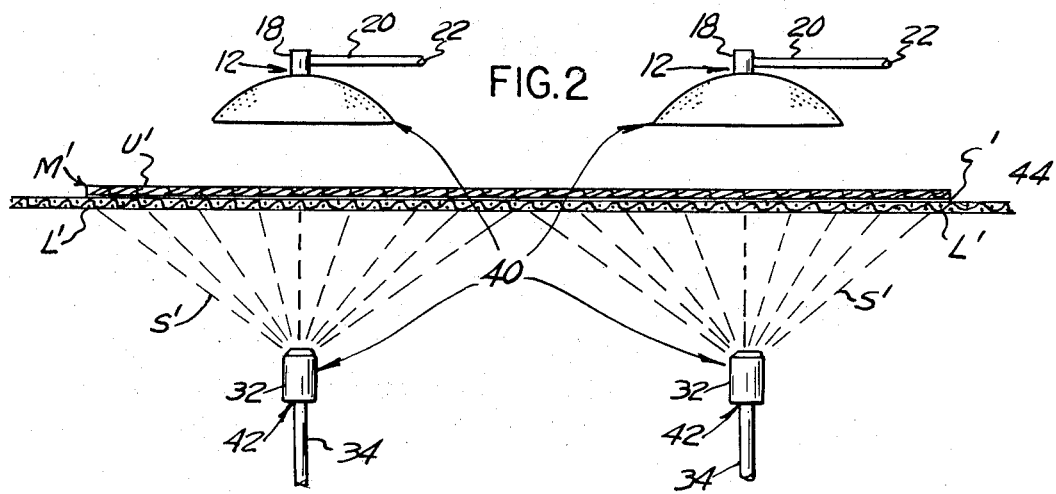

3,788,505

METHOD FOR VACUUM PICK-UP OF POROUS MATERIALS

This is a division of our co-pending application, Ser. No. 181,074, filed Sept. 16, 1971, for Apparatus and Method for Vacuum Pick-Up of Porous Materials, now U. S. Pat. No. 3,710,953, issued Jan. 16, 1973.

BACKGROUND OF THE INVENTION

Hitherto, the picking up and moving of porous materials such as cloth from one point to another has been very difficult because of the fact that the porosity of the cloth or other porous material, such as ceramic articles, allows the air to pass through the material and thus does not permit a vacuum to build up sufficiently for the porous material to be retained by suction on a vacuum cup or against a vacuum chamber. Where large volumes of air are exhausted in order to create a vacuum sufficient to lift small or light-weight pieces of cloth or other porous material, the expense of furnishing the power required for the development of a sufficient suction has proved to be prohibitive.

SUMMARY OF THE INVENTION

The present invention by spraying, rolling or otherwise coating a cloth or other porous material with a liquid that either dries or remains in a liquid state sufficient to temporarily inhibit the air flow through the pores permits the material to be picked up by a vacuum device and transferred to the desired location before the porosity reoccurs.

In the drawings:

FIG. 1 is a diagrammatic view of one form of means and method for the vacuum pick-up and transfer of porous material, by applying a liquid coating from and overhead spray source to the upper surface of the material;

FIG. 2 is a diagrammatic view of the modification wherein the liquid coating is applied to the lower surface of a single layer of porous material; and FIG. 3 is a view similar to FIG. 2 but showing in cross-section the lifting of a plurality of layers of porous material by applying a liquid coating to the lower surface of the lowermost layer thereof.

Referring to the drawings in detail, FIG. 1 shows an apparatus, generally designated 8, for lifting and transferring a piece M of porous material from a substantially imperforate support 10, such as a table or conveyor, to another location (not shown by means of a vacuum cup device 12. The latter is shown diagrammatically for purposes of simplicity as consisting of a resilient cup 14 of elastomeric material, such as natural or synthetic rubber or resilient synthetic plastic, having a suction chamber 16 in its interior connected through a passageway 17 in a hollow stem 18 to a tubular arm 20 the bore 22 of which is connected to a suction source such as a vacuum pump (not shown) or other means for producing a vacuum within the vacuum chamber 16.

As shown more fully in cross-section in FIG. 3, the vacuum cup device 12 is provided at the rim 24 of the cup 14 with a perforated or reticulated wall 26 through which air can pass but which prevents the porous material M from being drawn into the chamber 16 by the air being withdrawn through the passageway 28 within the pipe or hose 22. The vacuum cup device 12 is provided with conventional means (not shown) for raising and lowering it by the tubular arm 20 as well as swinging it from one location to another, such as from a pick-up station to a deposit station. Such means which has been found successful for this purpose is disclosed and claimed in the Kirsch and Robb U.S. Pat. No. 3,406,837 issued Oct. 22, 1968 for Lifting and Swinging Work Transfer Device.

The lifting and transferring apparatus 8 is provided with liquid coating means 30 such as spray heads or nozzles 32 connected to liquid supply pipes 34 for supplying and projecting a liquid spray S upon the upper surface of the material M. The liquid spray S may conveniently consist of water supplied under pressure through the pipes 34 to the spray heads 32 which in turn propel it downward upon the upper surface U of the material M, which ordinarily is porous sheet material.

In the operation of the lifting and transferring apparatus 8, let it be assumed that the pieces of material M have been deposited on the upper surface 34 of the support 10 and are to be lifted and transferred to another location. In accordance with the present invention, water or other suitable liquid is projected in the form of a spray S upon the upper surface U of the material M, whereupon the transfer mechanism is caused to lower the vacuum cup device 12 so that its rim 24 engages the upper surface U which has been rendered temporarily non-porous or imperforate by the coating C of liquid momentarily filling up the pores. As a result, the suction is enabled to build up within the chamber 16 inside the cup 14, which in turn causes the material M to adhere to the rim 24 thereof. As a result, the raising of the vacuum cup device 12 by the tubular arm 20 causes the piece of material M to be lifted therewith and transferred to a place of deposit before the liquid coating C disappears from the pores. The reversal of the vacuum pumping action within the vacuum cup chamber 16 causes the material M to be released and dropped onto the conveyor or into the tote box or other place of deposit of the transferred material M.

The modified porous material lifting and transferring apparatus, generally designated 40, shown in FIG. 2 employs similar vacuum cup devices 12 to the vacuum cup device 12 described above in connection with FIG. 1. In FIG. 2, a plurality of the vacuum cup devices 12 are employed because of the greater length of the porous material article M'. Similarly, a plurality of liquid coating means 42 placed beneath the porous material M' deposit the liquid coating C' on the lower surface L' thereof through a perforated support 44 such as a wire screen panel or conveyor belt. The liquid coating means 42 may employ the same or similar spray heads 32 and liquid supply pipes 34 as are described above in connection with FIG. 1 to discharge liquid sprays S' upward instead of downward as in FIG. 1. It will be further understood that the tubular arms 20 of the vacuum cup devices 12 of FIG. 2 are similarly incorporated in a lifting and swinging device (not shown) such as has been mentioned above in connection with FIG. 1.

In the operation of the lifting and transferring apparatus 40 of FIG. 2, let it be assumed that the piece of material M' has been placed upon the screen member 44, such as a screen panel or conveyor belt, and that the spray heads or nozzles 32 have been activated to project liquid sprays S', such as water sprays, upward through the wire screen panel or belt 44 to deposit the liquid coating C' on the lower side L' of the material M', temporarily closing up the pores thereof. While the pores are thus closed, the vacuum cup devices 12 are lowered by their tubular arms 20 into contact with the upper surface U' of the material M' and suction created therein, whereupon the subsequent lifting and swinging of the vacuum cup devices 12 also lifts and swings the porous material M' off the screen panel or belt 44 and transfers it to the desired place of deposit. The reversal of the suction in the vacuum cup devices 12 breaks the vaccum in the chambers 16 thereof. As a result, the porous material piece or article M' is ejected and dropped onto the place of deposit or disposal.

The arrangement shown in FIG. 3 is similar to that of FIG. 2 and is consequently designated with the same reference numerals. In FIG. 3, however, the lifting and transferring apparatus 40 is applied to the lifting and transferring of a plurality of layers of material M' and M''. The spray head or nozzle 32 of the liquid coating means 42 is similarly placed beneath the wire screen panel or belt 44 where it deposits the liquid coating C' on the lower side L' of the lowermost panel or sheet of material M'. In this manner, the depositing of the single coating C' suffices to render temporarily substantially imperforate a stack or pile of pieces of material M' and M'' so that they will be lifted as a unit by the tubular arm 20 the vacuum cup device 12.

I claim:

1. A method for vacuum pick-up of a porous material, comprising
    depositing a liquid coating upon a surface of the porous material sufficient to temporarily substantially close the pores thereof,
    and applying a suction force to the upper surface of the material to lift the same while the liquid is in a fluid condition and said pores remain substantially closed.

2. A method, according to claim 1, wherein the liquid coating is deposited on the same side of the material as the side subjected to the suction force.

3. A method, according to claim 1, wherein the liquid coating is deposited on the opposite side of the material from the side subjected to the suction force.

4. A method, according to claim 1, wherein the liquid coating is deposited on the lower side of the lowermost layer of a plurality of layers of material.

* * * * *